E. F. W. ALEXANDERSON.
APPARATUS FOR PRODUCING AN ELECTROMOTIVE FORCE OF SPECIAL WAVE FORM.
APPLICATION FILED AUG. 22, 1914.
1,250,752.
Patented Dec. 18, 1917.
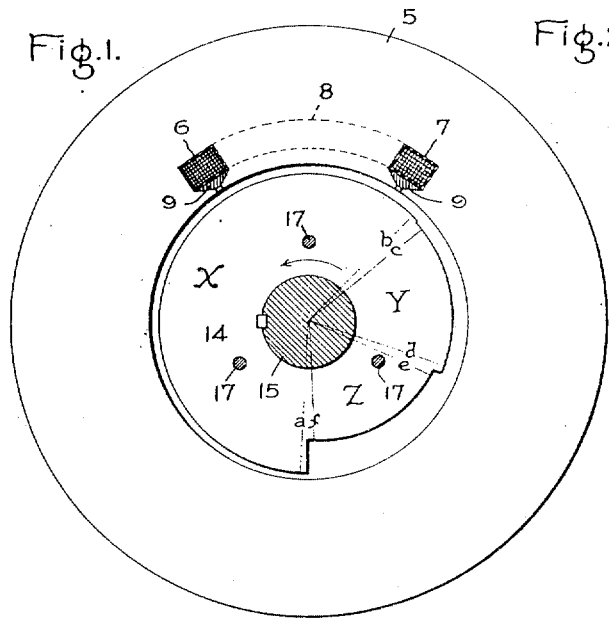
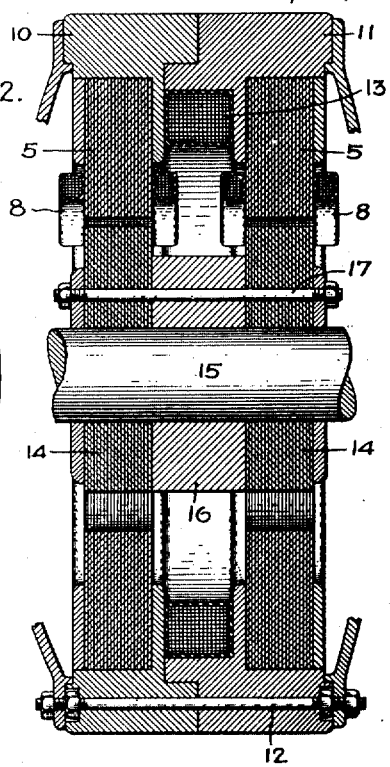
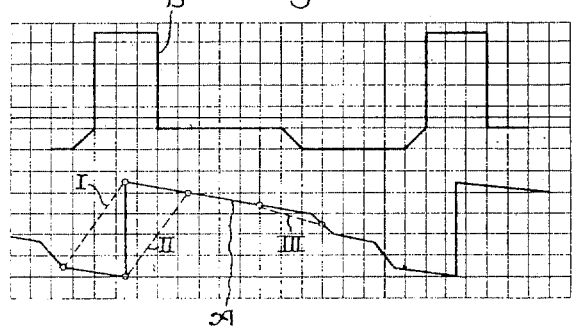
WITNESSES:
Marcus L. Byng
Edmund ...
INVENTOR
ERNST F. W. ALEXANDERSON.
BY Albert G. Davis
HIS ATTORNEY.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

APPARATUS FOR PRODUCING AN ELECTROMOTIVE FORCE OF SPECIAL WAVE FORM.

1,250,752.    Specification of Letters Patent.    Patented Dec. 18, 1917.

Application filed August 22, 1914. Serial No. 858,077.

*To all whom it may concern:*

Be it known that I, ERNST F. W. ALEXANDERSON, a citizen of the United States, residing at Schenectady, in the county of Schenectady, State of New York, have invented certain new and useful Improvements in Apparatus for Producing an Electromotive Force of Special Wave Form, of which the following is a specification.

My invention relates to apparatus for producing an electromotive force of special wave form. The object of my invention is to provide an improved apparatus for producing an alternating electromotive force of unsymmetrical wave form. A further object of my invention is to provide an improved dynamo-electric machine adapted to generate an alternating electromotive force of a predetermined special wave form.

The features of novelty which I consider patentably characteristic of my invention are definitely indicated in the claims appended hereto. The principle of my invention and the construction of an apparatus embodying the same will be understood from the following description taken in connection with the accompanying drawings, in which:

Figure 1 is a partial sectional elevation showing the stator and rotor members of an apparatus embodying the novel features of my invention; Fig. 2 is a sectional end elevation of the apparatus shown in Fig. 1; and Figs. 3 and 4 are explanatory diagrams.

The convenient and accurate production of an electromotive force of a predetermined special wave form is very desirable in certain fields of electrical engineering. A particular instance of the use of such a special wave form electromotive force is in the multi-party bell ringing devices for telephone systems. In these devices selective action is obtained by the use of operating electromotive forces of predetermined wave form. Heretofore, an electromotive force of special wave form has been obtained by means of a rotatable commutator having a plurality of segments operatively connected to a potential rheostat in such a way that any desired potential, either positive, zero or negative, may be connected to any number of the segments, so that in one revolution of the commutator the time during which different voltages should be applied, as well as the magnitude of the voltage, may be proportioned as necessary to produce the desired wave form. In accordance with my present invention an electromotive force of practically any desired wave form may be dynamically produced in a simple, accurate and efficient manner. It is thus possible, in accordance with my invention, to dynamically produce unsymmetrical wave forms which are in effect like the wave forms heretofore produced by the commutator methods, and which are in every respect sufficiently close approximations thereto for all practical purposes.

The principle of my present invention consists in generating an electromotive force of a predetermined desired wave shape by the use of an electric current-carrying coil interlinked with a magnetic circuit, the reluctance of which is periodically varied by a rotating member, the shape of the rotating member being such that the differential variation of the magnetic reluctance of the magnetic circuit is equal to the momentary value of the electromotive force of special wave shape which it is desired to produce. In carrying out my invention I provide a current-carrying coil interlinked with a magnetic circuit together with means whereby the necessary change in the flux interlinked with the coil may be effected to produce the electromotive force of the special wave form. An electromotive force is generated in the current-carrying coil by the change in the total flux interlinked with the coil, and the differential of the change in the total flux interlinkage between the coil and the magnetic field is designed in accordance with my present invention to be substantially proportional to the instantaneous values of the electromotive force of the desired special wave form.

My invention will be best understood by reference first to Figs. 1 and 2 of the drawings, which illustrate an apparatus designed in accordance with the principle of my invention for producing an alternating electromotive force of special wave form. The apparatus is in substance an inductor alternator having a stationary armature winding consisting of a single coil, a stationary exciting winding, and a rotatable magnetic inductor. The stator 5 of the apparatus has on its inner periphery two spaced slots 6 and 7. In the particular machine illustrated the slots 6 and 7 embrace $\frac{1}{10}$ of the stator periphery. A coil 8 is positioned in the slots and is held securely therein by suitable wedges 9. The free terminals of the coil 8 serve as the source from which the alternating electromotive force of special wave form is taken. It will of course be understood that the stator may carry more than one coil, and I have merely illustrated one coil in the accompanying drawings for the purpose of explaining the principle of my invention.

Reference to Fig. 2 of the drawings will show that the machine has duplicate stator parts. That is, there are two similar laminated magnetic stator members 5 each carrying a coil 8 in the spaced slots 6 and 7. The two magnetic stator members 5 are suitably spaced from one another and secured in their respective spaced positions by means of two annular magnetic frame members 10 and 11 and coöperating bolts 12. An exciting coil 13 is carried by the frame members 10 and 11 and is positioned between two stator members 5, and is adapted to develop a magnetic field to which the conductors of the coils 8 are subjected.

The apparatus also has two rotors or inductors 14, one coöperating with each stator member 5. Each inductor consists of a laminated magnetic body of special peripheral configuration suitably keyed to a rotatably mounted shaft 15. The inductors are securely fastened together with a magnetic spacing member 16 therebetween by bolts 17. It will thus be evident that the stator members 5 and the rotor members 14 constitute the magnetic circuit for the flux producing the field to which the coils 8 are subjected.

Each rotor 14 has a periphery of varying radial dimension, whereby the air gap between the stator and the rotor members is ununiform, so that rotation of the rotor varies in a predetermined way the reluctance of the magnetic circuit in the vicinity of the coil located in the slots 6 and 7. Fig. 1 shows clearly the peculiar peripheral configuration of the rotor in the dynamo-electric machine which I have illustrated by way of example to explain the principle of my invention. It will be observed that the rotor has a ratchet-like peripheral surface, whereby the surface of the rotor is divided into three sections, each section having a gradually varying radial width. Thus, the maximum radial width $a$ of the section X is greater than the minimum radial width $b$ of this section, the maximum radial width $c$ of the adjacent section Y is greater than the minimum radial width $d$ and the maximum radial width $e$ of the third section Z is greater than the minimum radial width $f$. It will be observed that the variation in radial width of each section, that is, the variation in width from $a$ to $b$ of section X, from $c$ to $d$ of section Y, and from $e$ to $f$ of section Z, is gradual, whereas the variation in radial width of the sections themselves is abrupt and of a much larger magnitude.

The exciting coil 13 is energized by direct current, as in an inductor alternator, and sets up a flux passing through the air gaps between the two stator members 5 and the two rotor members 14. Due to the special peripheral configuration of the rotors, whereby an ununiform air gap is produced, the flux form at any point of the stator will vary as the rotor rotates. The flux will have during one revolution of the rotor in the direction of the arrow the form indicated by curve A in Fig. 3. It will be observed that the flux curve is made up of three sections of gradually decreasing flux values, corresponding to the three sections X, Y, and Z of the rotor, two relatively abrupt points of flux decrease, corresponding to the passage from section X to section Y and from section Y to section Z, respectively, of the rotor, and one abrupt point of flux increase, corresponding to the passage from section Z to section X of the rotor.

The electromotive force induced in the coil 8 is determined by the variation in the total flux interlinked with the coil. If we call the flux interlinked with the conductors in the slot 7 the "incoming flux" and the flux interlinked with the conductors in the slot 6 the "outgoing flux," the resultant electromotive force induced in the coil is determined by the difference between the "incoming" and the "outgoing" fluxes. The difference in the value of the "incoming" and "outgoing" fluxes can be shown to be proportional to the differential of the total flux variation between the slots 6 and 7. If, therefore, we integrate the total flux variation between the slots 6 and 7 and obtain the differential of this integral the result will be proportional to the instantaneous voltage induced in the coil 8. The magnetic inductor is, therefore, so shaped that the differential of the variation of the magnetic reluctance of the magnetic circuit of the machine effected by the rotation of the inductor is substantially proportional to the momentary values of the electromotive force of special wave shape which it is desired to produce.

The calculated voltage at the terminals of the coil 8 when subjected to a flux variation of the character produced by the rotation of an inductor of the configuration herein illustrated is represented by curve B of Fig. 3, of the drawings. When the coil 8 occupies a position with respect to the flux wave as diagrammatically indicated at 1 in Fig. 3 of the drawings, the conductors located in the slot 7 will be cutting a magnetic field of maximum value, while the conductors located in the slots 6 will be cutting a magnetic field of very much smaller value. The resultant voltage induced in the coil 8 and appearing at its terminals is the voltage induced in the conductors of the coil by the variation in the total flux interlinked with the coil. When the coil 8 is in the position indicated at I in Fig. 3, the change in the total flux interlinked with the coil is large, and the voltage induced in the coil is correspondingly large, as represented in the voltage curve B. Just before the forward tip of section X of the rotor reaches the slot 6, the coil 8 will occupy a position with respect to the flux wave indicated at II in Fig. 3 of the drawings. An instant later the conductors in the slots 6 are subjected to a magnetic field of maximum value and the change in the total flux interlinked with the coil is now of a relatively small magnitude and is furthermore opposite in effect, so that a negative voltage of small magnitude appears at the terminals of the coil 8. That this voltage is negative will be apparent by observing that the "outgoing flux" is larger than, and hence dominates, the "incoming flux." When the coil 8 occupies the position indicated at I, the "incoming flux" is greater that the "outgoing flux." When the forward tip of section Y of the rotor reaches the slot 7, that is, when the coil 8 occupies the position indicated at III, the change in the total flux interlinked with the coil 8 becomes larger, and, being still of the same direction, a negative voltage of larger magnitude is induced in the coil 8. For the remainder of the cycle the change in the total flux interlinked with the coil 8 is uniform, whereby a constant negative voltage is induced in the coil until the forward tip of section X of the rotor reaches the slot 7, whereupon the variation in the total flux interlinked with the coil is suddenly increased and reversed in effect resulting in the generation in the coil 8 of the maximum positive voltage.

In Fig. 4 of the drawings I have illustrated by curve C a voltage wave form obtained by the commutator method for obtaining an electromotive force of special wave form as described hereinbefore. Curve D of this figure represents an oscillogram of the voltage obtained by a dynamo-electric machine constructed in accordance with the principle of my invention. The actual voltage curve D, as indicated by the oscillogram, is in every respect an entirely satisfactory approximation of the desired electromotive force of special wave form, as indicated by the curve C.

I have explained my invention by illustrating and describing a particular embodiment thereof, but it will be readily understood by those skilled in the art that the invention may be embodied in many other forms than that shown and described. I, accordingly, do not wish to be restricted to the particular form and construction disclosed herein by way of example for the purpose of setting forth my invention in accordance with the patent statutes. The terms of the appended claims, therefore, are not restricted to the precise structure disclosed, but are intended to cover all changes and modifications within the spirit and scope of my invention, and it will hence be understood that my invention may be embodied in practice in various other ways than that herein illustrated and described and still be within the purview of the claims appended hereto.

What I claim as new and desire to secure by Letters Patent of the United States, is:

1. An apparatus for producing an alternating electromotive force of unsymmetrical wave form comprising a stator of magnetic material having two spaced slots on its inner periphery, an electric current conductive coil positioned in said slots, an exciting coil adapted to develop a magnetic field to which said first coil is subjected, and a rotor of magnetic material having its periphery divided into three sections each section being of gradually varying radial width, one of said sections being of greater circumferential width than either of the other two sections.

2. An apparatus for producing an alternating electromotive force of unsymmetrical wave form comprising a stator of magnetic material having two spaced slots on its inner periphery, an electric current conductive coil positioned in said slots, an exciting coil adapted to develop a magnetic field to which said first coil is subjected, and a rotor having its peripheral surface divided into three sections each section being of gradually varying radial width with an abrupt change in the radial widths of adjoining portions of any two adjacent sections.

3. An apparatus for producing an alternating electromotive force of unsymmetrical wave form comprising a magnetic circuit having an air gap therein, an electric current conductive coil interlinked with said magnetic circuit, a rotatable magnetic member adapted by its rotation to periodically present opposite said coil a peripheral surface whose radial width abruptly increases from a minimum value to a maximum value an then decreases to the minimum value by alternate gradual and abrupt changes.

In witness whereof I have hereunto set my hand this 21st day of August, 1914.

ERNST F. W. ALEXANDERSON.

Witnesses:
BENJAMIN B. HULL,
HELEN ORFORD.

It is hereby certified that in Letters Patent No. 1,250,752, granted December 18, 1917, upon the application of Ernst F. W. Alexanderson, of Schenectady, New York, for an improvement in "Apparatus for Producing an Electromotive Force of Special Wave Form," an error appears in the printed specification requiring correction as follows: Page 3, line 120, claim 3, after the word "changes" insert the clause *and means for developing a flux in said magnetic circuit;* and that the said Letters Patent should be read with this correction therein that the same may conform to the record of the case in the Patent Office.

Signed and sealed this 12th day of February, A. D., 1918.

[SEAL.]

J. T. NEWTON,

*Commissioner of Patents.*

Cl. 171—209.